(12) United States Patent
Nagpal et al.

(10) Patent No.: US 8,447,732 B2
(45) Date of Patent: May 21, 2013

(54) DEDUPLICATION IN NETWORK STORAGE WITH DATA RESIDENCE COMPLIANCE

(75) Inventors: Abhinay R. Nagpal, Maharashtra (IN); Sandeep R. Patil, Elmsford, NY (US); Gandhi Sivakumar, Melbourne (AU); Carolyn A. Whitehead, Norwich, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/196,285

(22) Filed: Aug. 2, 2011

(65) Prior Publication Data

US 2013/0036100 A1    Feb. 7, 2013

(51) Int. Cl.
*G06F 17/30*    (2006.01)
(52) U.S. Cl.
USPC ........... 707/636; 707/662; 707/664; 707/692; 711/154; 711/162; 711/170
(58) Field of Classification Search
USPC .......................... 707/692; 711/154, 162, 170
See application file for complete search history.

(56) References Cited

U.S. PATENT DOCUMENTS

| | | | |
|---|---|---|---|
| 6,256,675 B1 * | 7/2001 | Rabinovich | 709/241 |
| 6,327,550 B1 * | 12/2001 | Vinberg et al. | 702/186 |
| 8,190,835 B1 * | 5/2012 | Yueh | 711/162 |
| 2002/0023123 A1 * | 2/2002 | Madison | 709/203 |
| 2004/0117377 A1 * | 6/2004 | Moser et al. | 707/10 |
| 2008/0229037 A1 * | 9/2008 | Bunte et al. | 711/162 |
| 2009/0144224 A1 | 6/2009 | Phan et al. | |
| 2010/0064166 A1 | 3/2010 | Dubnicki et al. | |
| 2010/0161926 A1 * | 6/2010 | Li et al. | 711/163 |
| 2010/0241507 A1 * | 9/2010 | Quinn et al. | 705/14.42 |
| 2010/0332401 A1 | 12/2010 | Prahlad et al. | |
| 2010/0332454 A1 * | 12/2010 | Prahlad et al. | 707/654 |
| 2010/0333116 A1 | 12/2010 | Prahlad et al. | |
| 2011/0225209 A1 * | 9/2011 | Volvovski et al. | 707/803 |
| 2011/0225360 A1 * | 9/2011 | Baptist et al. | 711/114 |
| 2011/0320865 A1 * | 12/2011 | Jain et al. | 714/6.22 |
| 2012/0078643 A1 * | 3/2012 | Nagpal et al. | 705/1.1 |
| 2012/0197898 A1 * | 8/2012 | Pandey et al. | 707/741 |

OTHER PUBLICATIONS

Hitachi Data Systems; "Separating Hype from "How to"—A Practical Guide to Understanding and Deploying Cloud for the Enterprise"; Google/Hitachi White Paper; Jun. 2010, 21 pp.
Girola, M., et al.; "IBM Data Center Networking: Planning for Virtualization and Cloud Computing"; GOOGLE/IP.COM/IBM Redbooks; 2011, 258 pp.

(Continued)

*Primary Examiner* — Hanh Thai
(74) *Attorney, Agent, or Firm* — Cantor Colburn LLP; Louis Percello

(57) ABSTRACT

Deduplication in a network storage environment includes, for files stored in a network, determining a location constraint status specified by a compliance agreement for each of the files. Location constraint statuses include a location of persistent residency and no residency restriction. Deduplication also includes selecting a file from the files in the network and identifying corresponding redundant files, the selected file and the corresponding redundant files representing a set. Deduplication further includes determining the location constraint status for each of the files in the set. For the files in the set having a location constraint status specifying a location of persistent residency, the deduplication includes retaining a master copy at the respective location of persistent residency, and removing the corresponding redundant files from the network.

21 Claims, 6 Drawing Sheets

OTHER PUBLICATIONS

Mell, et al. "The NIST Definition of Cloud Computing (Draft): Recommendations of the National Institute of Standards and Technology," National Institute of Standards and Technology, U.S. Department of Commerce, Jan. 2011, 7 pp.

Coughlin, TM.; "Virtualization of Consumer Storage"; INSPEC/IEEE; 1pp.; 2010. (Abstract Only).

\* cited by examiner

| UNIQUE USER ID | FILE NAME | GEOGRAPHIC RESIDENCY REQUIREMENT |
|---|---|---|
| 001 | <PATH>/A.txt | YES |
| 002 | <PATH>/B.txt | NO |
| 003 | <PATH>/C.txt | NO |
| ... | ... | ... |
| N | <PATH>/N | YES/NO |

DEDUPLICATION IN NETWORK STORAGE WITH DATA RESIDENCE COMPLIANCE

BACKGROUND

The present invention relates to data storage management, and more specifically, to deduplication in network storage with data residence compliance.

Cloud computing is a paradigm in which tasks are assigned to a combination of connections, software and services that are accessed over a network. This network of servers and connections is collectively known as "the cloud."

Based on the number and type of resources that make up the cloud, these resources may require a great deal of storage space. Advances in disk and storage technologies have helped to manage performance and space requirements of network clouds. For example, deduplication techniques have been developed for maximizing available storage space in which redundant data or files are eliminated from storage, thereby increasing the storage capabilities of the cloud.

In cloud computing, storage clouds face challenges with respect to security and compliance. In many countries there are laws and regulatory compliances that mandate the geographic boundaries in which a business or entity's data/files must reside. Additionally, in some countries in Europe, e.g., if a business wishes to store specified types of business electronic data in another country, it must seek prior governmental approval. Such requirements may become difficult to manage and comply with in a public cloud or large private cloud in which data is spread across multiple data centers. Moreover, performing deduplication of data/files residing across several data centers in view of these security and compliance requirements can add to the above-stated challenges.

SUMMARY

According to one embodiment of the present invention, a method for deduplication in a network storage environment is provided. The method includes, for files stored in a network, determining a location constraint status specified by a compliance agreement for each of the files. The location constraint statuses include a location of persistent residency and no residency restriction. The method also includes selecting a file from the files in the network and identifying corresponding redundant files, the selected file and the corresponding redundant files representing a set. The method further includes determining the location constraints status for each of the files in the set. For the files in the set having a location constraint status specifying a location of persistent residency, the method includes retaining a master copy at the respective location of persistent residency, and removing the corresponding redundant files from the network.

According to another embodiment of the present invention, a system for implementing deduplication in a network storage environment is provided. The system includes a computer processor and deduplication logic executable by the computer processor. The deduplication logic is configured to implement a method. The method includes, for files stored in a network, determining a location constraint status specified by a compliance agreement for each of the files. The location constraint statuses include a location of persistent residency and no residency restriction. The method also includes selecting a file from the files in the network and identifying corresponding redundant files, the selected file and the corresponding redundant files representing a set. The method further includes determining the location constraints status for each of the files in the set. For the files in the set having a location constraint status specifying a location of persistent residency, the method includes retaining a master copy at the respective location of persistent residency, and removing the corresponding redundant files from the network.

According to a further embodiment of the present invention, a computer program product for implementing deduplication in a network storage environment is provided. The computer program product includes a storage medium having program instructions embodied thereon, which when executed by a computer cause the computer to implement a method. The method includes, for files stored in a network, determining a location constraint status specified by a compliance agreement for each of the files. The location constraint statuses include a location of persistent residency and no residency restriction. The method also includes selecting a file from the files in the network and identifying corresponding redundant files, the selected file and the corresponding redundant files representing a set. The method further includes determining the location constraints status for each of the files in the set. For the files in the set having a location constraint status specifying a location of persistent residency, the method includes retaining a master copy at the respective location of persistent residency, and removing the corresponding redundant files from the network.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

FIG. 6 illustrates a table utilized to facilitate deduplication in a network storage environment in an exemplary embodiment.

DETAILED DESCRIPTION

Figure 1:
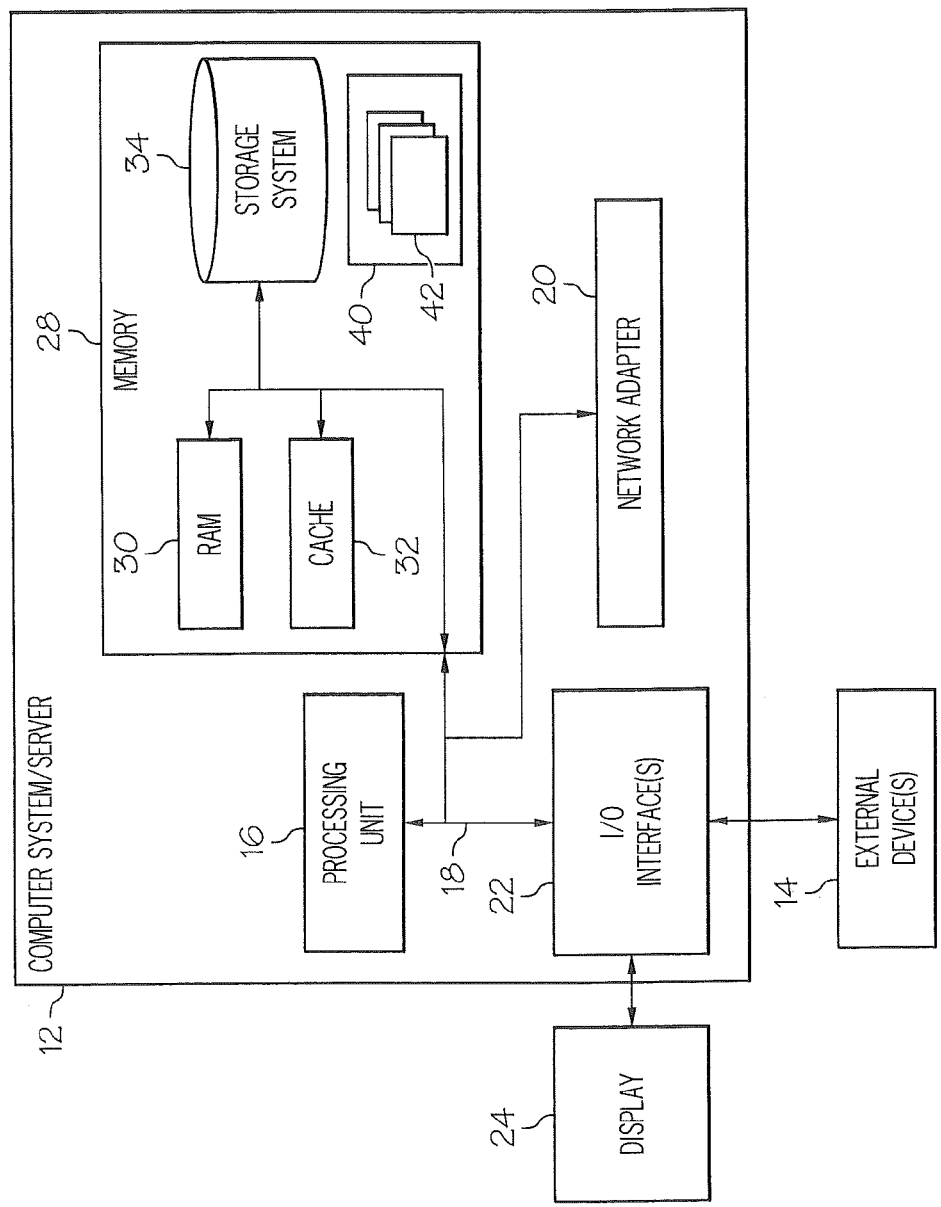
FIG. 1 depicts a cloud computing node according to an embodiment of the present invention.

Exemplary embodiments of the invention provide for deduplication in a network storage environment (e.g., a cloud storage architecture). The exemplary deduplication processes consider residency requirements of file storage when considering which redundant files to remove during deduplication. Residency requirements refer to restrictions or constraints with respect to one or more geographic locations in which copies of a file are permitted to reside in storage. For example, where copies of a file are located across multiple dispersed data centers in a network cloud, the exemplary deduplication processes identify the redundant files, ensure that a single master copy is stored in a location that complies with the residency requirements, and then eliminate all other copies of the file from their storage locations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
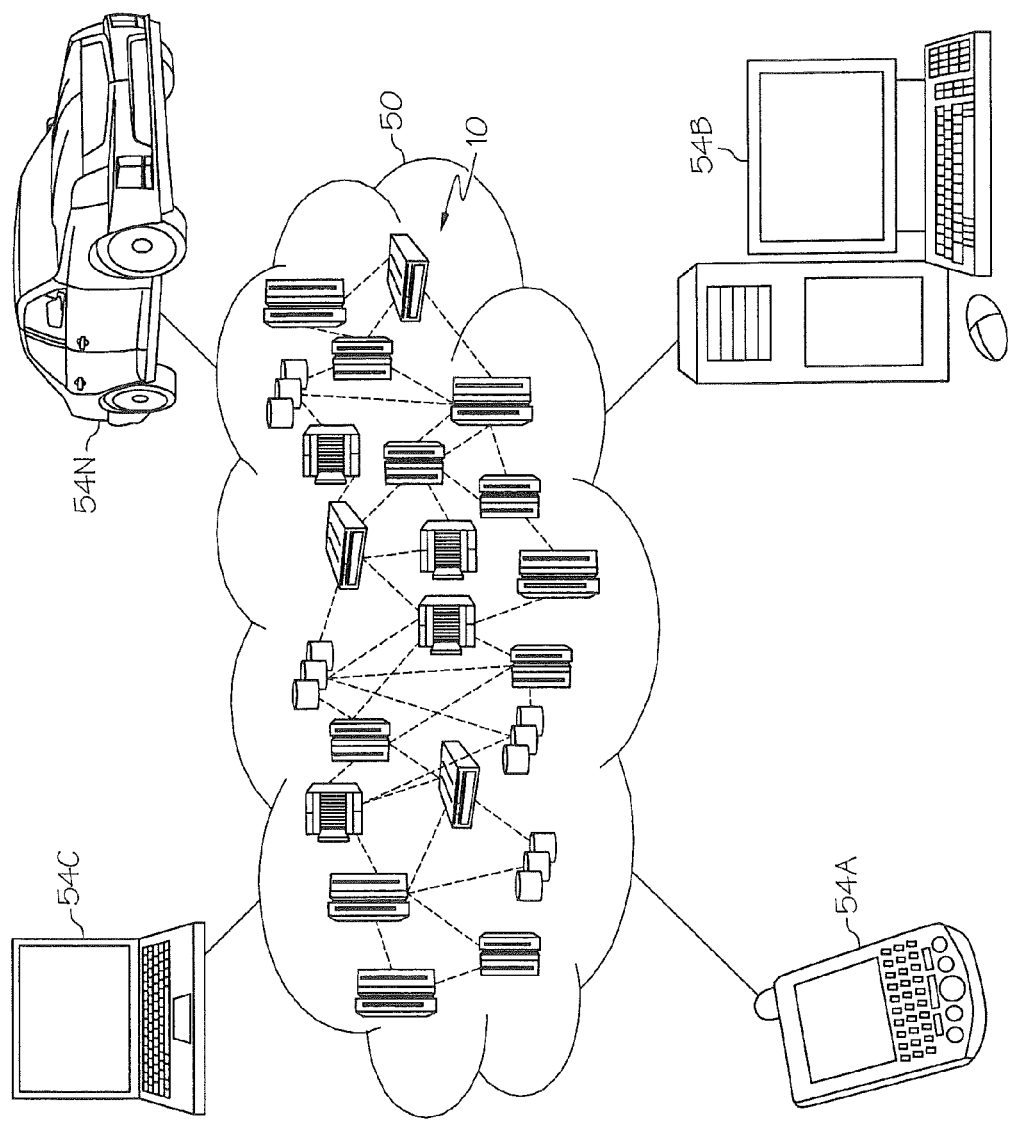
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
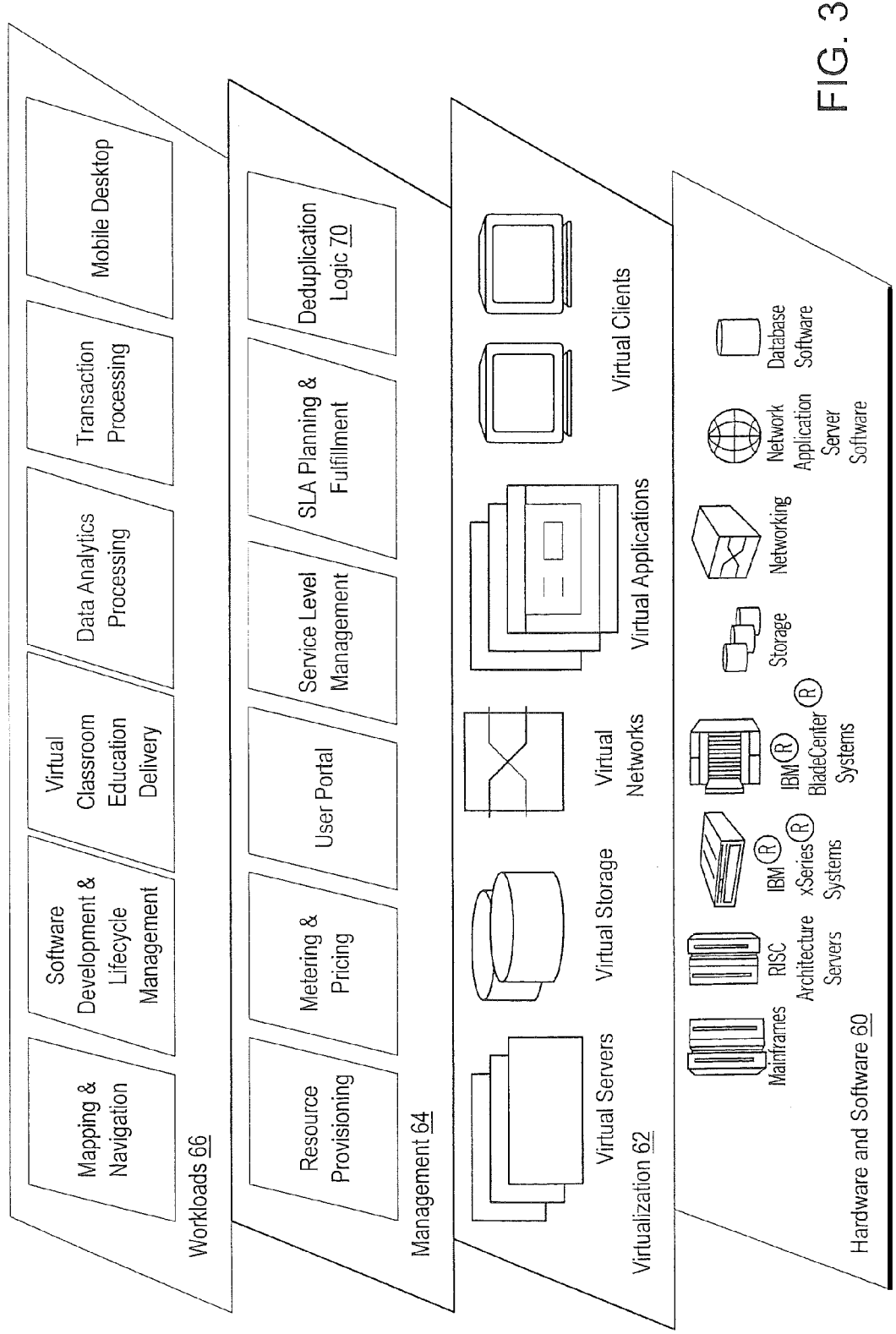
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, a deduplication application or logic 70 in the management layer 64 implements the intelligent caching processes described herein; however, it will be understood that the deduplication logic 70 may be implemented in any layer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The deduplication logic 70 includes one or more algorithms to implement embodiments described herein to provide deduplication with data residence compliance. In an embodiment, the deduplication logic 70 is coupled to and/or resides in the memory 28 shown in FIG. 1. In addition, embodiments of the deduplication logic 70 include one or more program modules 42 of the program/utility 40 shown in FIG. 1. In a further embodiment, the deduplication logic 70 is part of the management layer 64 and is executed on hardware located in the hardware and software layer 60.

Figure 4:
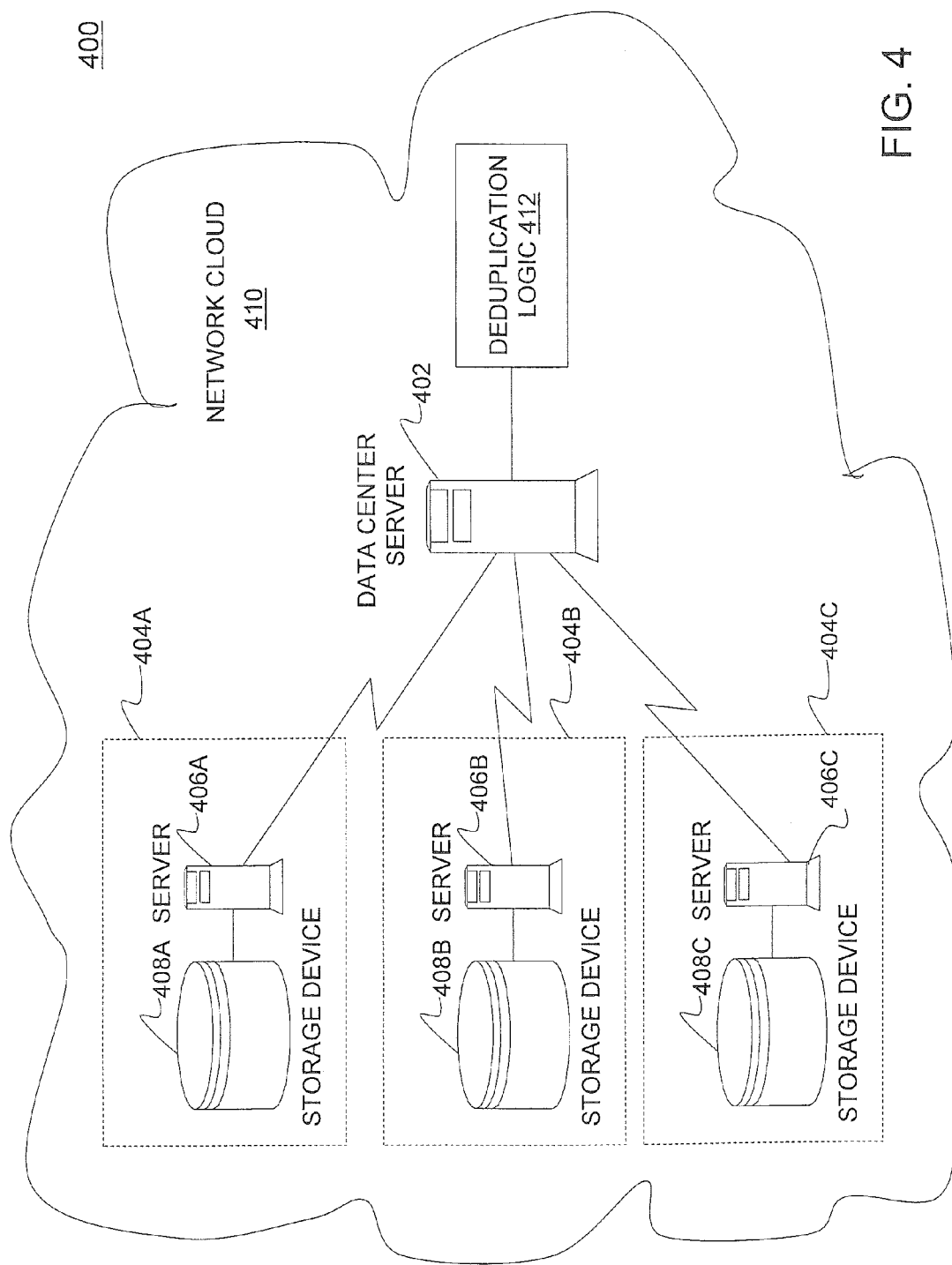
FIG. 4 depicts a block diagram of a system upon which deduplication in a network storage environment may be implemented in an exemplary embodiment.

Turning now to FIG. 4, a system upon which deduplication processes with residence compliance may be implemented will now be described in an exemplary embodiment. The system 400 includes a network cloud 410 (e.g., a cloud computing environment) in which a data center server 402 is in communication with data centers 404A-404C via corresponding servers 406A-406C. The data center server 402 may be implemented as a high-speed processing device, such as a mainframe computer, or by multiple computing devices. The data center server 402 is communicatively coupled to the servers 406A-406C via any known networking technologies and network resources typically associated with a network cloud architecture (e.g., as shown and described in FIG. 2). The data center server 402 implements deduplication logic 412 for performing the exemplary deduplication processes described herein. In one embodiment, the data center server 402 stores residency requirement information for each of the files in the network cloud 410. The data center server 402 may also store service level agreements, contracts, or regulations governing data residency compliance requirements.

In an exemplary embodiment, the network cloud 410 enables documents and files to be uploaded and shared with network users, e.g., the computer system/server 12 of FIG. 1, or any of the devices 54A-54N shown in FIG. 2.

Each of the data centers 404A-404C is communicatively coupled to a respective storage device 408A-408C. The storage devices 408A-408C store files and data that are retrievable by one or more user systems, e.g., network users accessing the network cloud 410. The user systems implement one or more applications and access the storage devices 404A-404C to read and write data to and from the storage devices 408A-408C in response to various operations conducted via the applications.

While only three data centers 404A-404C, three servers 406A-406C, and three storage devices 408A-408C are shown in FIG. 4, it will be understood that any number of data centers, servers, and storage devices may be present in the network cloud 410 to realize the advantages of the exemplary embodiments described herein. The representation shown in FIG. 4 is provided for illustrative purposes and is not to be construed as limiting in scope.

Figure 5:
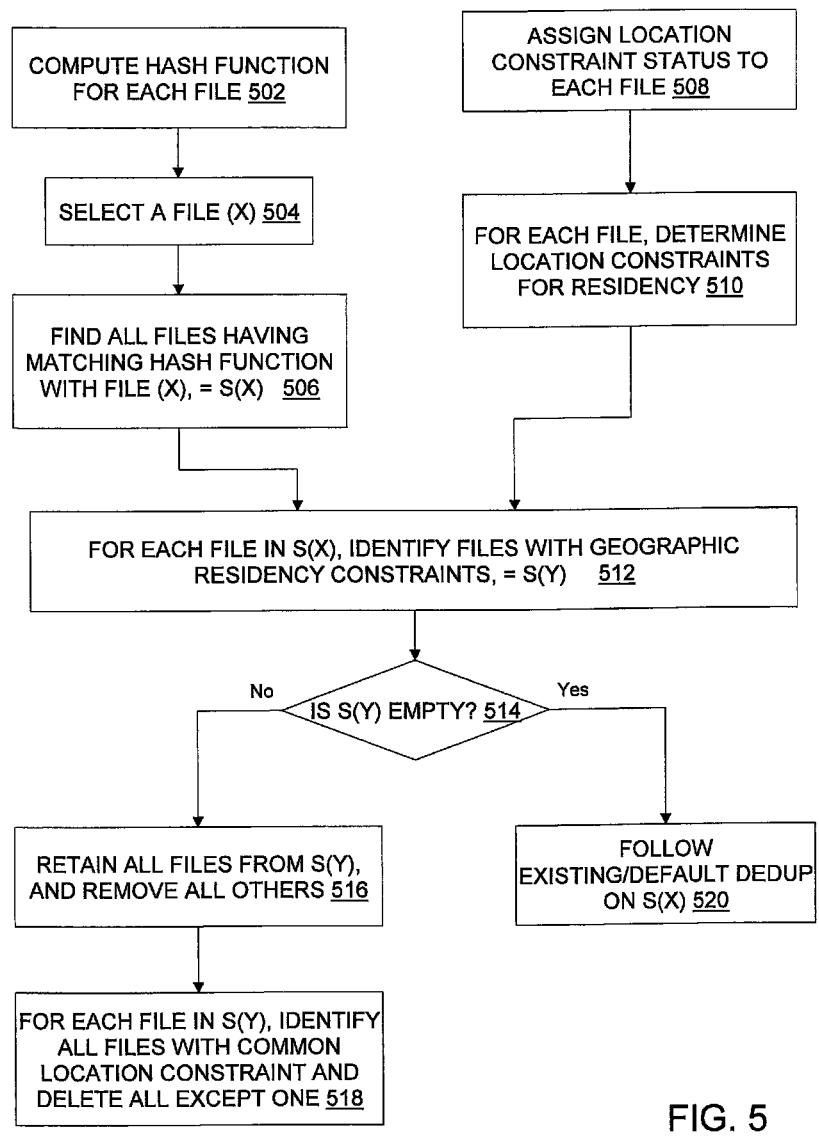
FIG. 5 illustrates a flow diagram describing a process for implementing deduplication in a network storage environment in an exemplary embodiment.

Turning now to FIG. 5, a process for implementing deduplication with residency compliance will now be described in an exemplary embodiment. It will be understood that the processes described in steps 502-506 may be performed simultaneously, or asynchronously, with respect to the processes described in steps 508 and 510. In addition, while the processes described in FIG. 5 relate to deduplication functions performed at a 'file' level, it will be understood that the processes may be configured for use at a 'data item' level as well.

At step 502, the deduplication logic 412 computes a hash function for each file stored in the network cloud 410 (e.g., including files stored in storage devices 408A-408C). At step 504, the deduplication logic 412 selects a file (referred to herein as file X).

At step 506, the deduplication logic 412 searches for all files that have the same hash value as the selected file X. These matching files indicate a set of redundant or duplicate files of file X and are referred to herein as S(X).

At step 508, a location constraint status is assigned to each of the files in the network cloud 410 via the deduplication logic 412. The location constraint status may be assigned based on a requirement specified by a corresponding file owner (e.g., a business, entity, or individual) and/or a governmental regulation. For example, if the files are considered to include sensitive content, government laws may prohibit the permanent storage of such files in foreign locations (or alternatively, restrict the persistent storage of such files in a local storage location, such as within a country's geographic boundaries).

The location constraint status may be assigned to files using a variety of techniques. For example, as shown in FIG. 6, a table 600 includes fields for assigning location constraint status indicators (YES/NO in field 606) to a user identification (e.g., file owner, business entity, government agency, etc., in field 602) and a file name in field 604. In an alternative embodiment, the location constraint status may be assigned by examining the contents of a file for specified criteria, such as sensitive language, determining a persistent storage location for the file, and assigning a location constraint status based on the persistent location.

At step 510, the deduplication logic 412 determines the location constraint status of each file in the network cloud 410 and also determines what specific locations are specified by the status. For example, a location constraint status of YES may prompt the deduplication logic 412 to access a record (e.g., a service level agreement, contract, or regulation) that indicates what location a master copy of the file must be stored in when deduplication processes are performed. In one embodiment, a location constraint status may indicate a location of persistent residency (i.e., a location in which a master copy of the file must be stored), and another location constraint status may specify no restrictions on storage locations for a given file.

At step 512, for the set of files S(X), the deduplication logic 412 identifies which of the files in the set have an assigned location constraint status indicating a location of persistent residency. This group of files identified is referred to as S(Y). The set S(Y) distinguishes files in the set of redundant files having a residency restriction from those that do not, as well as to identify the particular residency location.

At step 514, the deduplication logic 412 determines if there are any files in the set S(Y). If so, all files in the set S(Y) are retained, and all others are removed from storage at step 516. For each file in the set S(Y), the deduplication logic 412 identifies all files with a common location via the location constraint status and deletes all copies except one, which is stored as the master copy at step 518.

Returning to step 514, if the deduplication logic 412 determines there are no files in the set S(Y), the deduplication logic 412 follows a default or existing deduplication process on the set S(X) at step 520. For example, the default or existing deduplication process may include storing as the master copy a file at a location in which it is most frequently accessed.

Technical effects and benefits include deduplication in a network storage environment (e.g., a cloud storage architecture) that considers residency requirements of file storage when considering which redundant files to remove during deduplication. Where copies of a file are located across multiple dispersed data centers, the exemplary deduplication processes identify the redundant files, ensure that a single master copy is stored in a location that complies with the residency requirements, and then eliminate all other copies of the file from their storage locations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for deduplication in a network storage environment, comprising:
   for files distributively stored across a network spanning multiple geographic regions, determining via a computer processor, a location constraint status specified by a compliance agreement for each of the files, wherein location constraint statuses include a geographic location of persistent residency and no geographic residency restriction;
   selecting a file from the files in the network and identifying corresponding redundant files, the selected file and the corresponding redundant files representing a set;
   determining the location constraint status for each of the files in the set; and
   for the files in the set having a location constraint status specifying a geographic location of persistent residency, retaining via the computer processor, a master copy at the respective geographic location of persistent residency, and removing the corresponding redundant files from the network.

2. The method of claim 1, wherein removing the corresponding redundant files from the network includes removing redundant files stored in the same geographic location as the master copy.

3. The method of claim 1, further comprising:
   assigning the location constraint status to each of the files stored in the network.

4. The method of claim 3, wherein the geographic location of persistent residency is provided by a file owner.

5. The method of claim 3, wherein the geographic location of the persistence residency is specified by a government agency.

6. The method of claim 1, wherein the location constraint status is assigned via a table having a user identification representing one of a file owner and a government agency with respect to the master copy, and a file name.

7. The method of claim 1, wherein the location constraint status is assigned by examining contents of the file for a confidentiality indicator.

8. A system for deduplication in a network storage environment, comprising:
   a computer processor; and
   deduplication logic executable by the computer processor, the deduplication logic configured to implement a method, the method comprising:
   for files distributively stored across a network spanning multiple geographic regions, determining a location constraint status specified by a compliance agreement for each of the files, wherein location constraint statuses include a geographic location of persistent residency and no geographic residency restriction;
   selecting a file from the files in the network and identifying corresponding redundant files, the selected file and the corresponding redundant files representing a set;
   determining the location constraint status for each of the files in the set; and
   for the files in the set having a location constraint status specifying a geographic location of persistent residency, retaining a master copy at the respective geographic location of persistent residency, and removing the corresponding redundant files from the network.

9. The system of claim 8, wherein removing the corresponding redundant files from the network includes removing redundant files stored in the same geographic location as the master copy.

10. The system of claim 8, wherein the deduplication logic is further configured to implement:
    assigning the location constraint status to each of the files stored in the network.

11. The system of claim 10, wherein the geographic location of persistent residency is provided by a file owner.

12. The system of claim 10, wherein the geographic location of the persistence residency is specified by a government agency.

13. The system of claim 8, wherein the location constraint status is assigned via a table having a user identification representing one of a file owner and a government agency with respect to the master copy, and a file name.

14. The system of claim 8, wherein the location constraint status is assigned by examining contents of the file for a confidentiality indicator.

15. A computer program product for deduplication in a network storage environment, the computer program product comprising a storage medium having program instructions embodied thereon, which when executed by a computer, cause the computer to implement a method, the method comprising:
   for files distributively stored across a network spanning multiple geographic regions, determining a location constraint status specified by a compliance agreement for each of the files, wherein location constraint statuses include a geographic location of persistent residency and no geographic residency restriction;
   selecting a file from the files in the network and identifying corresponding redundant files, the selected file and the corresponding redundant files representing a set;
   determining the location constraint status for each of the files in the set; and
   for the files in the set having a location constraint status specifying a geographic location of persistent residency, retaining a master copy at the respective geographic location of persistent residency, and removing the corresponding redundant files from the network.

16. The computer program product of claim 15, wherein removing the corresponding redundant files from the network includes removing redundant files stored in the same geographic location as the master copy.

17. The computer program product of claim 15, further comprising program instructions for:
   assigning the location constraint status to each of the files stored in the network.

18. The computer program product of claim 17, wherein the geographic location of persistent residency is provided by a file owner.

19. The computer program product of claim 17, wherein the geographic location of the persistence residency is specified by a government agency.

20. The computer program product of claim 15, wherein the location constraint status is assigned via a table having a user identification representing one of a file owner and a government agency with respect to the master copy, and a file name.

21. The computer program product of claim 15, wherein the location constraint status is assigned by examining contents of the file for a confidentiality indicator.

* * * * *